(12) United States Patent
Allu Balan et al.

(10) Patent No.: US 12,556,588 B2
(45) Date of Patent: Feb. 17, 2026

(54) SERVING CALL SESSION CONTROL FUNCTION (CSCF) RESTORATION WITH PROXY CSCF BINDING

(71) Applicant: T-Mobile USA, Inc., Bellevue, WA (US)

(72) Inventors: Harikishore Allu Balan, Lynnwood, WA (US); Saqib Badar, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 346 days.

(21) Appl. No.: 18/069,105

(22) Filed: Dec. 20, 2022

(65) Prior Publication Data

US 2024/0205268 A1    Jun. 20, 2024

(51) Int. Cl.
*H04L 12/00* (2006.01)
*H04L 65/1016* (2022.01)
*H04L 65/1104* (2022.01)

(52) U.S. Cl.
CPC ...... *H04L 65/1016* (2013.01); *H04L 65/1104* (2022.05)

(58) Field of Classification Search
CPC .......... H04L 65/1016; H04L 65/1104
See application file for complete search history.

(56) References Cited

U.S. PATENT DOCUMENTS

| | | | |
|---|---|---|---|
| 6,320,857 B1 | 11/2001 | Toennby et al. | |
| 6,876,633 B2 | 4/2005 | Strathmeyer et al. | |
| 7,269,160 B1 | 9/2007 | Friedman et al. | |
| 7,561,535 B2 | 7/2009 | Naqvi et al. | |
| 7,602,704 B2 | 10/2009 | Shaffer et al. | |
| 7,672,297 B2 | 3/2010 | Naqvi et al. | |
| 7,675,858 B2 | 3/2010 | Dekeyzer et al. | |
| 7,792,275 B2 | 9/2010 | Tai et al. | |
| 7,792,528 B2 | 9/2010 | Naqvi et al. | |
| 7,856,226 B2 | 12/2010 | Wong et al. | |
| 7,864,936 B2 | 1/2011 | Naqvi et al. | |
| 7,936,665 B2 | 5/2011 | Ishii | |

(Continued)

FOREIGN PATENT DOCUMENTS

| | | |
|---|---|---|
| CN | 102316435 B | 11/2014 |
| CN | 102761929 B | 12/2017 |

(Continued)

*Primary Examiner* — Noel R Beharry
*Assistant Examiner* — Lionel Preval
(74) *Attorney, Agent, or Firm* — Perkins Coie LLP

(57) ABSTRACT

Systems, methods, and devices that relate to prompt restoration of Internet Protocol (IP) Multimedia Subsystem (IMS) services when a Serving Call Session Control Function (S-CSCF) becomes unavailable are disclosed. In one example aspect, a method for wireless communication includes receiving, by a first network node in a network, a user profile associated with a user device from a home server configured to manage subscriber information. The user profile comprises binding information about a Proxy Call Session Control Function (P-CSCF) that is in communication with the user device. The method also includes retrieving, by a second network node, the binding information of the P-CSCF upon a third network node being unreachable for completing a call for the user device to enable a completion of the call for the user device.

20 Claims, 15 Drawing Sheets

(56) References Cited

U.S. PATENT DOCUMENTS

| | | |
|---|---|---|
| 7,970,909 B1 | 6/2011 | Cox et al. |
| 8,055,262 B1 | 11/2011 | Vu et al. |
| 8,078,166 B2 | 12/2011 | Thiebaut et al. |
| 8,078,733 B2 | 12/2011 | Stroem et al. |
| 8,170,005 B2 | 5/2012 | Mukaiyama et al. |
| 8,265,090 B2 | 9/2012 | Cai et al. |
| 8,295,158 B2 | 10/2012 | Li et al. |
| 8,374,172 B2 | 2/2013 | Jana et al. |
| 8,782,208 B2 | 7/2014 | Belinchon Vergara et al. |
| 9,596,274 B2 | 3/2017 | Lawson et al. |
| 9,602,556 B1 | 3/2017 | Cham |
| 9,756,134 B2 | 9/2017 | Klein |
| 2002/0118671 A1 | 8/2002 | Staples et al. |
| 2007/0116223 A1 | 5/2007 | Burke et al. |
| 2007/0127449 A1 | 6/2007 | Nix et al. |
| 2007/0197227 A1 | 8/2007 | Naqvi et al. |
| 2009/0191867 A1* | 7/2009 | Siegel ................ H04L 65/1095 455/435.1 |
| 2010/0223326 A1 | 9/2010 | Noldus et al. |
| 2011/0134804 A1 | 6/2011 | Maes |
| 2011/0161505 A1 | 6/2011 | Siegel et al. |
| 2011/0176537 A1 | 7/2011 | Lawson et al. |
| 2018/0007612 A1* | 1/2018 | Jahangir ................ H04L 67/53 |
| 2018/0048681 A1* | 2/2018 | Chiang ............... H04L 65/1104 |

FOREIGN PATENT DOCUMENTS

| | | |
|---|---|---|
| CN | 106549901 B | 4/2020 |
| CN | 108521404 B | 1/2022 |
| EP | 1753199 B1 | 10/2015 |
| EP | 2148521 B1 | 10/2016 |
| EP | 3007406 B1 | 12/2016 |
| EP | 1776840 B1 | 3/2017 |

* cited by examiner

SERVING CALL SESSION CONTROL FUNCTION (CSCF) RESTORATION WITH PROXY CSCF BINDING

BACKGROUND

The Internet Protocol (IP) Multimedia Subsystem (IMS) is an architectural framework that uses the Session Initiation Protocol (SIP) protocol to initiate, maintain, and terminate real-time sessions that include voice, video and messaging applications. The IMS has evolved over time to provide fast, secure, and stable multimedia services to end users.

BRIEF DESCRIPTION OF THE DRAWINGS

Detailed descriptions of implementations of the present technology will be described and explained through the use of the accompanying drawings.

Figure 1:
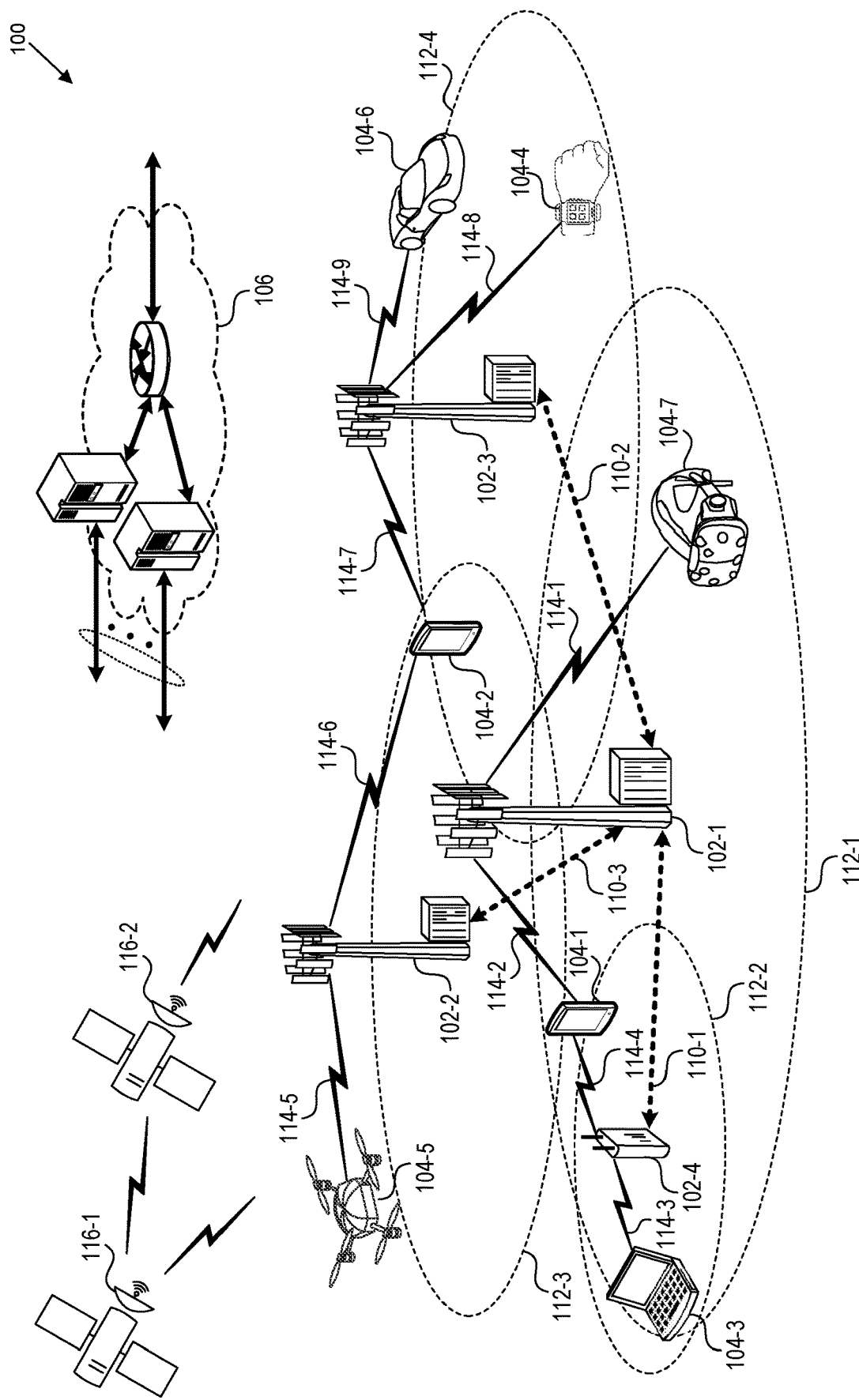
FIG. 1 is a block diagram that illustrates a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The IP Multimedia Subsystem or IP Multimedia Core Network Subsystem (IMS) is a standardized architectural framework for delivering IP multimedia services, including but not limited to IP phone calls and messages. Network issues that occur within the IMS can cause certain network nodes to become unreachable, impacting service quality and end-user experience of the multimedia services provided by the IMS.

Techniques are disclosed herein to enable prompt restoration of data to facilitate completion of calls or messages when a network node becomes unavailable in the IMS. In particular, when a network node becomes unavailable, binding information between a user device and a corresponding Proxy Serving Call Session Control Function (P-CSCF) can be added to the user profile and stored in a cache or an external database accessible to other network nodes (e.g., such as the Telephonic Application Server) so that a replacement node can retrieve the stored binding information (e.g., directly from the cache or the database, or indirectly via the user profile) and continue the signaling process to complete the communication without triggering a new registration process or relying on legacy circuit-switched (CS) network support, thereby reducing signaling overhead and conserving network resources.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW)

access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IOT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the wireless telecommunications network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provides data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally, or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites such as satellites 116-1 and 116-2 to deliver services anywhere and anytime and provide coverage in areas that are unreachable by any conventional Terrestrial Network (TN). A 6G implementation of the network 100 can support terahertz (THz) communications. This can support wireless applications that demand ultrahigh quality of service requirements and multi-terabits per second data transmission in the 6G and beyond era, such as terabit-per-second backhaul systems, ultrahigh-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low User Plane latency. In yet another example of 6G, the network 100 can implement a converged Wi-Fi and Core architecture to increase and improve indoor coverage.

Proxy Call Session Control Function (P-CSCF) Binding Data Restoration

Figure 2:
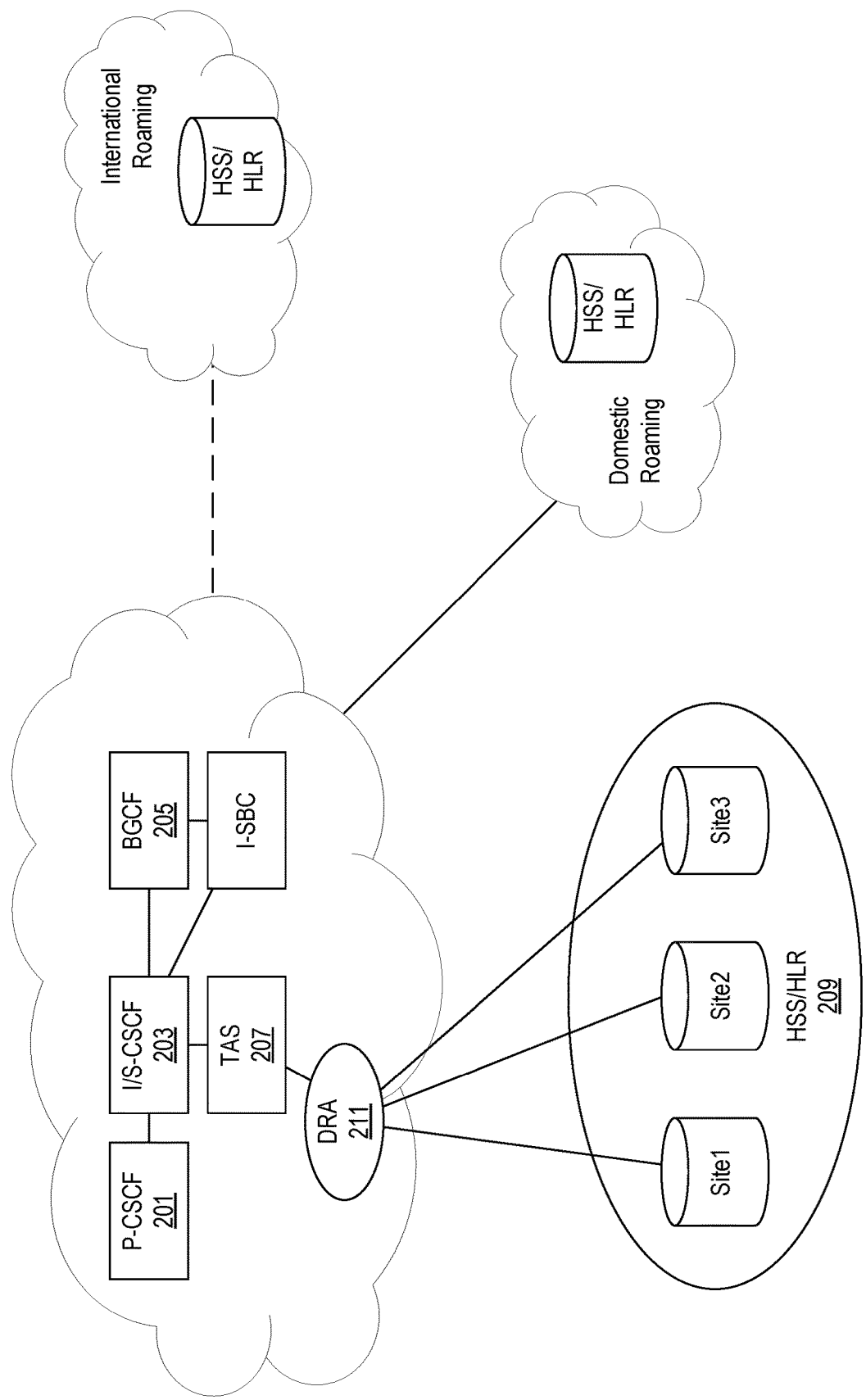
FIG. 2 illustrates an example architecture an Internet Protocol Multimedia Subsystem (IMS) network.

To enable delivery of IP multimedia services, the IMS has been introduced as an architectural framework, which uses the SIP protocol to initiate, maintain, and terminate real-time sessions that include voice, video and messaging applications. The SIP is used for signaling and controlling multimedia communication sessions in applications of Internet telephony for voice and video calls, in private IP telephone systems, in instant messaging over IP networks as well as voice calling over Long-Term Evolution (VOLTE) or New Radio (VONR). FIG. 2 illustrates an example architecture an IMS network. Some of the network functions provided by the IMS include:

1. Call Session Control Function (CSCF).
  1a. A Proxy-CSCF (P-CSCF) 201 is a SIP proxy that is the first point of contact for the IMS terminal.
  1b. An Interrogating-CSCF (I-CSCF) or a Serving-CSCF (S-CSCF) 203 is another SIP function located of an administrative domain. Its IP address is published in the Domain Name System (DNS) of the domain so that remote servers can find it, and use it as a forwarding point (e.g., registering) for SIP packets to this domain.
2. A Breakout Gateway Control Function (BGCF).
  The BGCF 205 is a SIP proxy that processes requests for routing from a I/S-CSCF 203 when it has determined that the session cannot be routed using DNS or Electronic Numbering (ENUM) lookups (ENUM)/DNS. It includes routing functionality based on telephone numbers.
3. Telephony Application Server (TAS)/Application Server (AS)
  The TAS 207 is a component used in the core network of a network operator to provide telephony applications and additional multimedia functions. The TAS can also be referred to as the Application Server (AS).
4. A Home Subscriber Server (HSS)/Home Location Register (HLR).
  The HSS/HLR 209 is a centralized database of subscriber information that allows Communications Service Providers (CSPs) to manage customers in real-time and in a cost-effective manner. The HSS/HLR can be in connection with the TAS via the Diameter Routing Agent (DRA) 211.

Figure 3A:
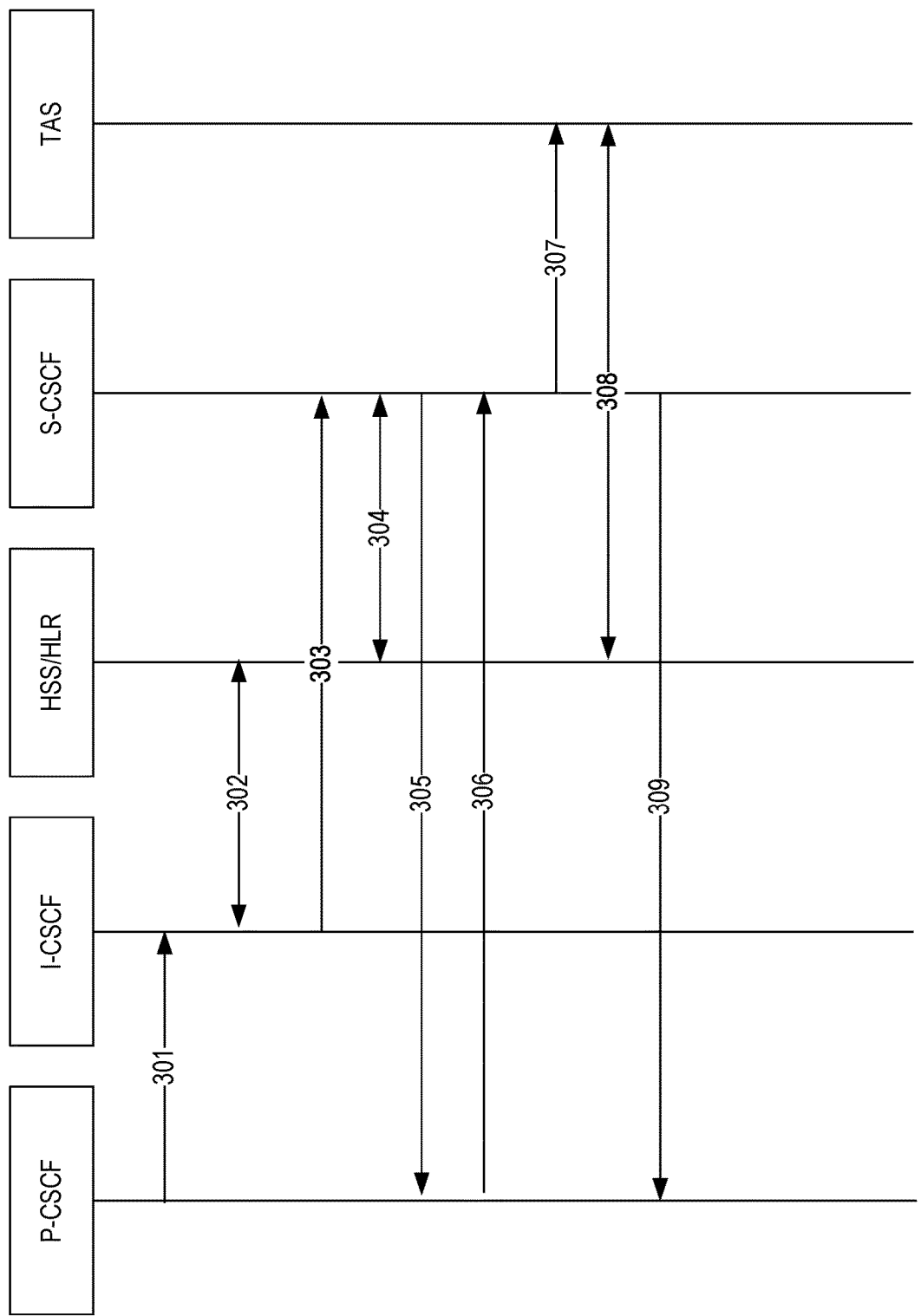
FIG. 3A illustrates an example Session Initiation Protocol (SIP) registration call flow.

The SIP Registration is a process of binding an endpoint's Address of Record (AOR) with its location. The SIP Endpoint (e.g., a User Equipment, UE) sends a SIP registration (REG) request to a Registrar, containing its AOR, location, authentication and other information in the message. For example, the UE initiates a SIP REG to the P-CSCF, using the P-CSCF IP address that was made available during the network attachment. FIG. 3A illustrates an example SIP registration call flow that includes the following operations:

Operation 301: The P-CSCF transmits a SIP Registration request (e.g., SIP REG) to the I-CSCF.

Operation 302: The I-CSCF and the HSS/HLR exchange User-Authorization-Request (UAR) and User-Authorization-Answer (UAA) messages to validate the user device and to return a selected S-CSCF based on S-CSCF capabilities.

Operation 303: The I-CSCF forwards the SIP REG request to the selected S-CSCF.

Operation 304: The HSS/HLR and the S-CSCF exchange Multimedia Authentication Request (MAR) and Multimedia Authentication Answer (MAA) messages to retrieve the authentication vectors for IMS security measures. The HSS/HLR stores the S-CSCF information. The S-CSCF downloads the initial filter criteria (iFCs) from the HSS/HLR via diameter Cx interface.

Operation 305: The S-CSCF challenges the UE by transmitting a 401 Unauthorized message via the P-CSCF.

Operation 306: The P-CSCF allocates ciphering and integrity key(s) to the UE. These keys are needed for establishing a security association between the P-CSCF and the UE. Such security association is also referred to as P-CSCF binding information. The P-CSCF then establishes a secure connection with the UE (e.g., TLS connection or IPsec). For example, the Authentication and Key Agreement (AKA) authentication ensures all traffic between UE and P-CSCF during a session is sent on IPsec-protected channels. Subsequently, the P-CSCF forwards a new SIP REG request from the UE to the S-CSCF via the I-CSCF.

Operation 307: The S-CSCF executes the iFCs for SIP REG and determines the application service such as TAS for multi-media services.

Operation 308: The TAS exchanges Subscribe-Notifications-Request (SNR)/Subscribe-Notifications-Answer (SNA) messages with the HSS/HLR to retrieve a user profile. The user profile can be implemented as an Extensible Markup Language (XML) document that includes different parts such as public identification, core network service authorization. In some embodiments, the HSS/HLR transfers the user profile to the S-CSCF, and the user profile is then transferred to the TAS that is in communication with the S-CSCF. On getting the user profile for telephony related services via diameter based Sh interface, the TAS caches the profile until the registration timer expiry to serve as the telephony server for the user.

Operation 309: The S-CSCF passes a 200 OK message to the P-CSCF via the I-CSCF. On receipt of the 200 OK from the I-CSCF, the P-CSCF changes the temporary set of security associations to a newly established set of security associations.

On successful registration, the P-CSCF stores the service route (e.g., S-CSCF information) against the UE binding reference it created to uniquely identify the UE and also engages the S-CSCF for originating session from the UE over the IMS network. The P-CSCF binding information can be constructed using the IP addresses of the end points, e.g., sip:bindingID@IP_Address:portNumber; transport=udp; EriBindingId=bindingID;eribind-generated-at=IP_Address. The S-CSCF uses the binding information that includes P-CSCF/UE unique binding provided by the P-CSCF to access the UE for terminating session(s). When the S-CSCF executes the iFCs and determines which TAS is attempted, the TAS obtains the original registration information including the P-CSCF binding information and retrieves the P-CSCF binding information when needed in case of network event(s).

Figure 3B:
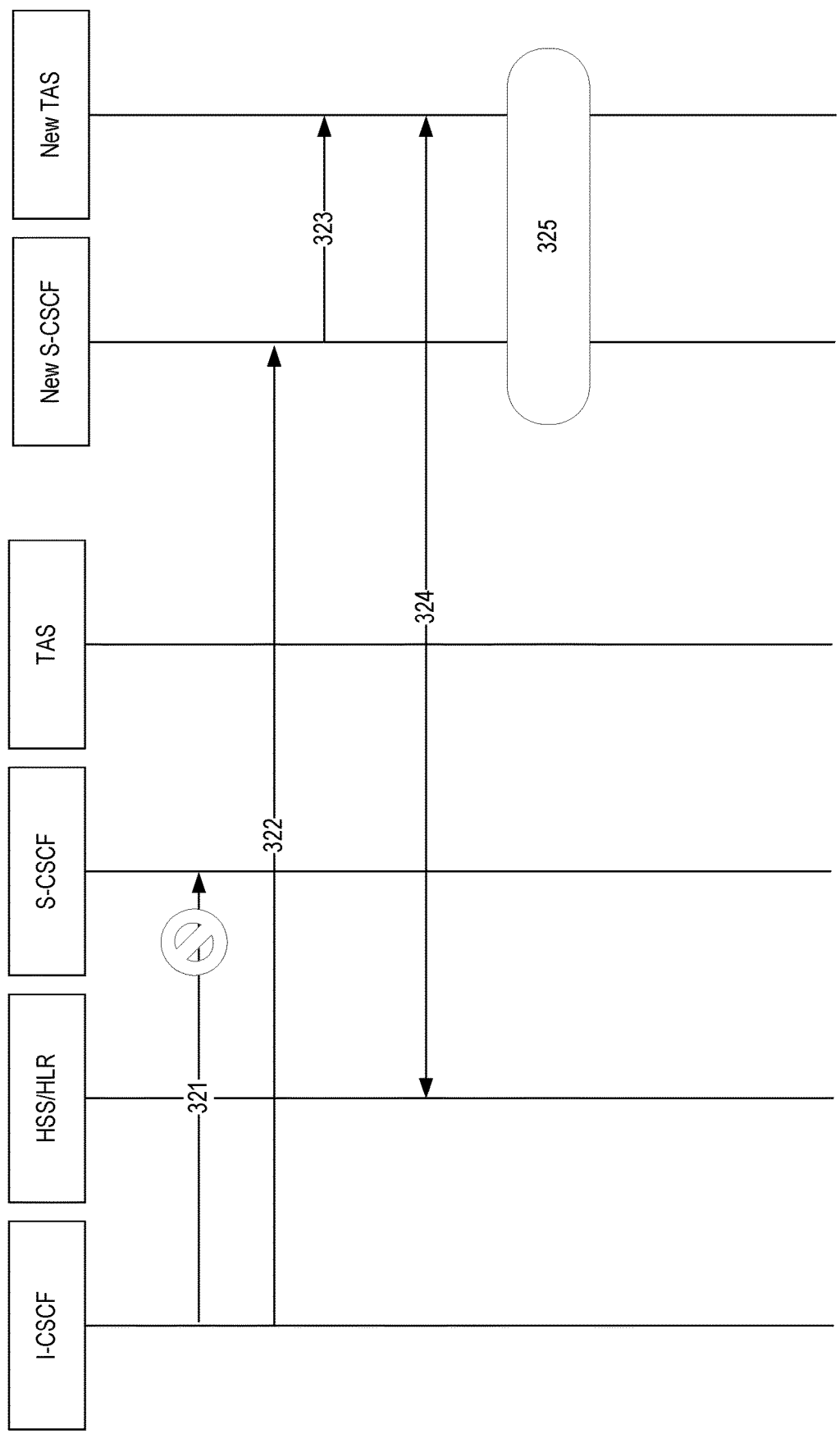
FIG. 3B illustrates an example SIP call flow when the Serving Call Session Control Function (S-CSCF) is unavailable.

In the event of network outage that impacts the S-CSCF, all users registered on the S-CSCF can counter registration (REG), re-registration (re-REG), mobile originating (MO) and mobile terminating (MT) call failures. FIG. 3B illustrates an example SIP call flow when the S-CSCF is unavailable. As shown in FIG. 3B, at Operation 321, the S-CSCF is unreachable to the P-CSCF via the I-CSCF. In some embodiments, the P-CSCF returns a specific error response to the UE to trigger a new registration. In some embodiments, to avoid signaling overhead and delay caused by new registration requests, the I-CSCF can adopt an alternative routing solution to select a new S-CSCF at Operation 322. The new S-CSCF can forward the routing invite to the TAS (the original TAS or a new TAS) at Operation 323.

At operation 324, the TAS can exchange SNR/SNA messages with the HSS/HLR to download the user profile. However, the TAS treats the invite from the new S-CSCF as an SIP unregister (UNREG) message and falls back on the circuit-switched (CS) support for routing the call. The TAS checks to see if it can obtain the Circuit-Switched Domain Routing Number (CSRN) from the HSS/HLR. If no CSRN can be found, the TAS decides that CS support is not present and routes the call to the voicemail or forwards the call based on user call-forwarding settings at Operation 325, resulting in call failures for the end users.

As shown in FIG. 3B, when the network outage impacts the S-CSCF, there is no clear way to promptly restore P-CSCF when a new S-CSCF is selected. In other words, data in the original S-CSCF cannot be effectively restored, leading to numerous call failures that can potentially impact millions of users.

This disclosure discloses techniques that can be implemented in various embodiments to reduce or minimize service impact when the S-CSCF becomes unreachable. Selected portion of data in the original S-CSCF can be backed-up in a local cache or an external database accessible to the TAS or other network nodes such as the HSS/HLR so that the newly selected S-CSCF can query and restore such information when the original S-CSCF becomes unavailable. For example, the P-CSCF's binding information (e.g., the secure association between the P-CSCF and the UE) can be stored and made accessible to the TAS/HSS/HLR so that the TAS/HSS/HLR can forward the information to the new S-CSCF to enable smooth recovery upon the failure of the original S-CSCF.

Figure 4A:
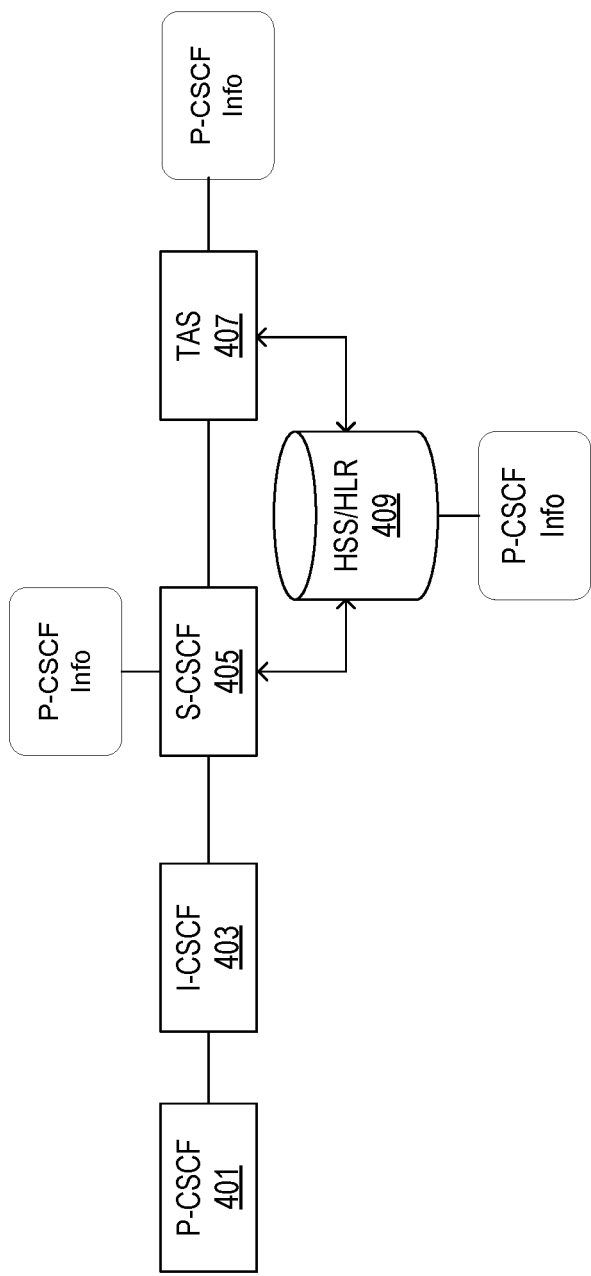
FIG. 4A illustrates an example architecture diagram associated with SIP registration in accordance with one or more embodiments of the present technology.

FIG. 4A illustrates an example architecture diagram associated with an SIP registration process in accordance with one or more embodiments of the present technology. As shown in FIG. 4A, during SIP registration process, the S-CSCF 405 can store information about the P-CSCF 401, such as the P-CSCF binding information. This information can be forwarded to the TAS 407 and be exchanged with the HSS/HLR 409 in the SNR/SNA messages (e.g., see Operation 307 in FIG. 3A), thereby allowing the P-CSCF information to be backed up and accessed subsequently by a newly selected S-CSCF (e.g., via the TAS 407 using an internal cache or external database, or via the HSS/HLR). Alternatively, or in addition, the TAS can store the P-CSCF binding information in the HSS in XML.

Figure 4B:
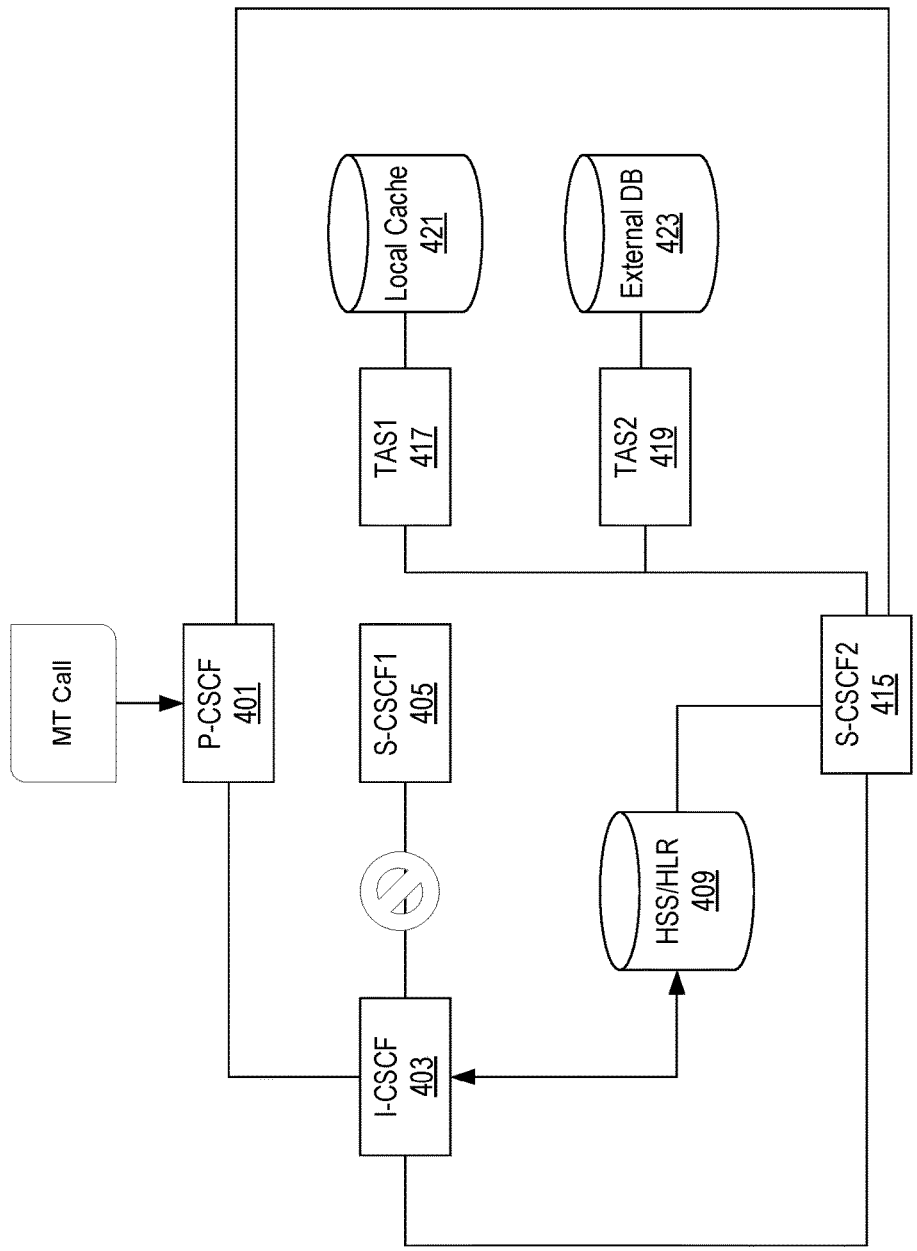
FIG. 4B illustrates another example architecture diagram in accordance with one or more embodiments of the present technology.

FIG. 4B illustrates another example architecture diagram in accordance with one or more embodiments of the present technology. When the I-CSCF 403 detects that the original S-CSCF1 405 is no longer available, it can select a new S-CSCF 415 based on the capabilities of the S-CSCFs. The newly selected S-CSCF2 415 can communicate with TAS and/or HSS/HLR to retrieve and recover the data that was previously associated with the S-CSCF1 405 to facilitate subsequent communication. The data can be stored in a local cache 421 that is accessible to TAS1 417 and/or an external DB 423 that is accessible to TAS2 419. The data can also be stored in the HSS/HLR. Given the restored data, the P-CSCF 401 can honor the new invite from new S-CSCF 415 as a binding for the specific call duration. In some embodiments, the HSS/HLR can also store the address of the TAS that is in communication with the original S-CSCF so that the newly selected S-CSCF can reach out to the TAS directly instead of determining a new TAS node.

Figure 4C:
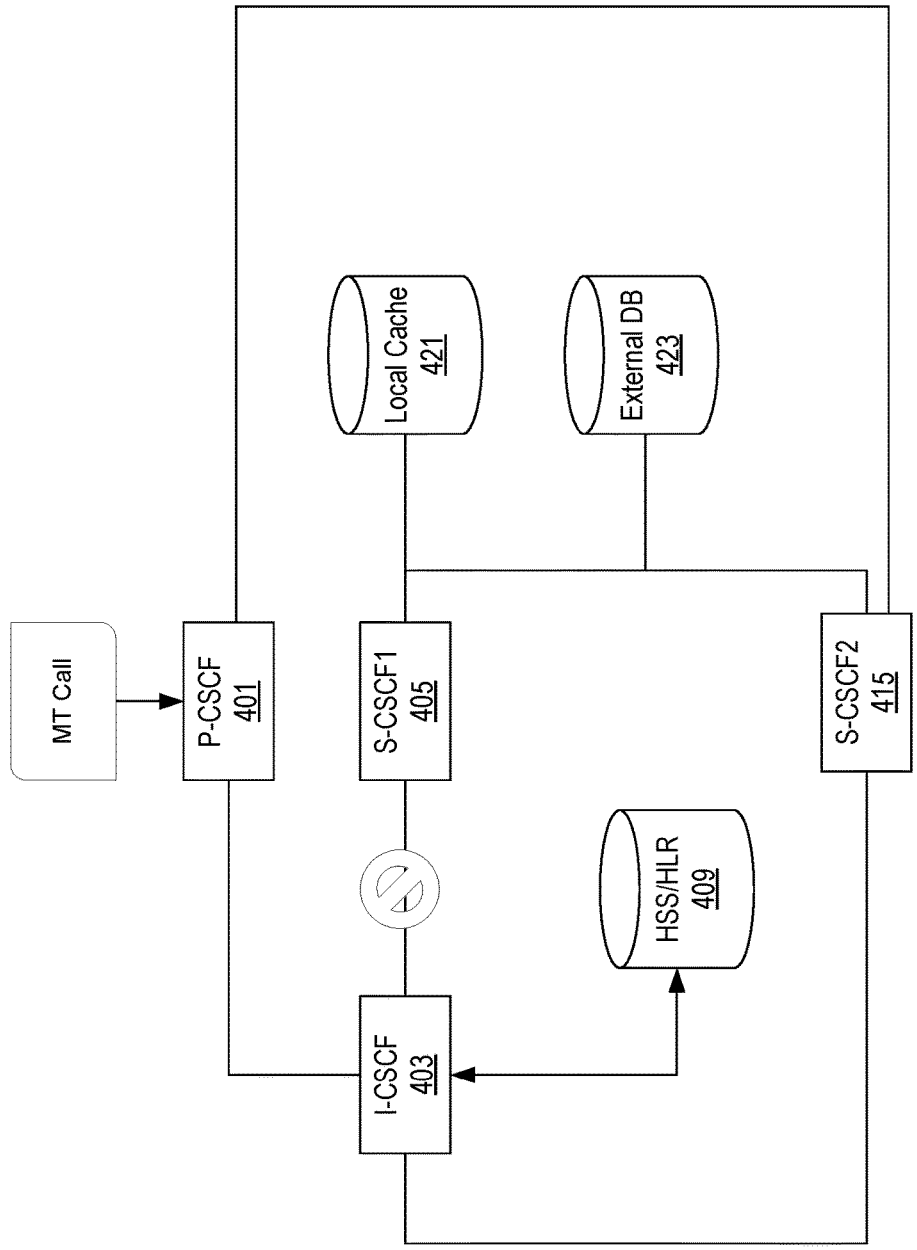
FIG. 4C illustrates yet another example architecture diagram in accordance with one or more embodiments of the present technology

FIG. 4C illustrates yet another example architecture diagram in accordance with one or more embodiments of the present technology. In this architecture, the S-CSCFs can have direct access to local cache(s) and/or external database(s) instead of going through the TAS/HSS/HLR. For example, referring back to FIG. 4A, the S-CSCF 405 stores a local copy of the information about the P-CSCF 401 and also provides a back-up copy of the information in an external database that is accessible to other S-CSCFs. When the I-CSCF 403 detects that the original S-CSCF1 405 is no longer available, it can select a new S-CSCF 415 based on the capabilities of the S-CSCFs. The newly selected S-CSCF 415 can access the backed-up information about the P-CSCF 401.

Figure 5:
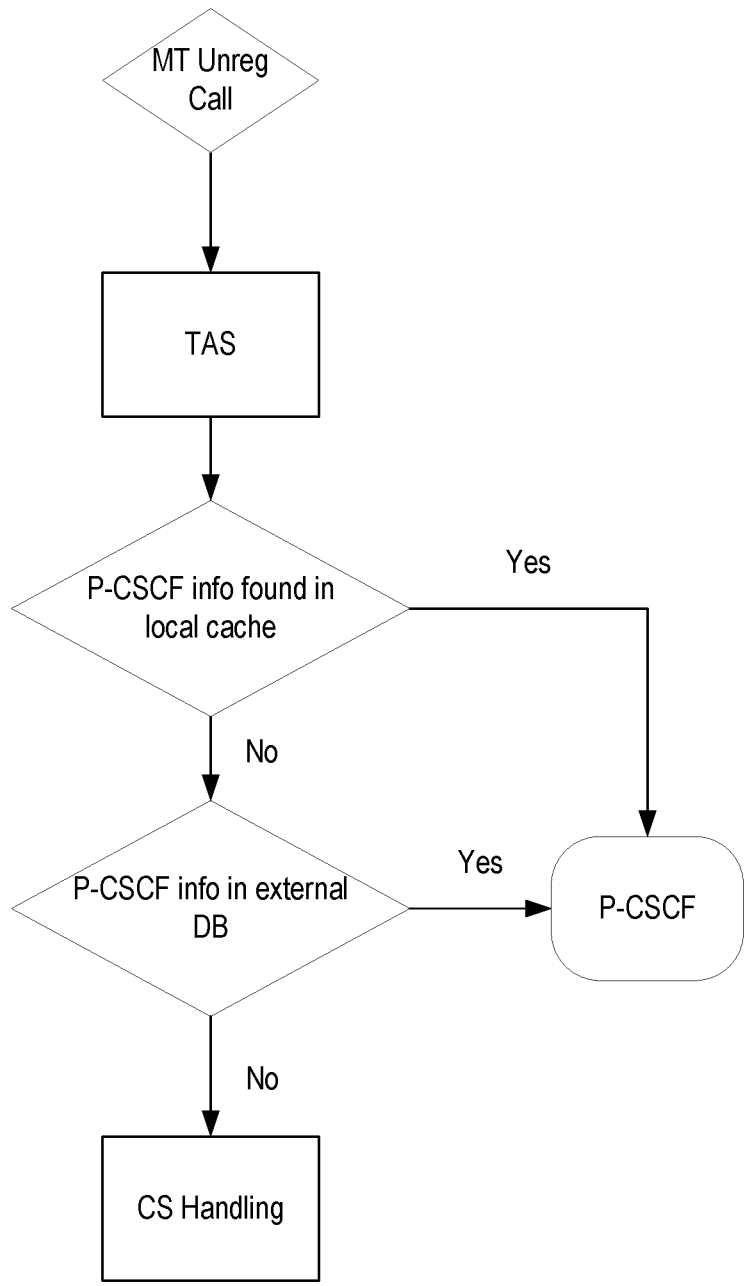
FIG. 5 illustrates an example flowchart of routing decisions in accordance with one or more embodiments of the present technology.

In some embodiments, the selected portion of data (e.g., P-CSCF binding) can be stored in HSS/HLR during the SIP registration process. In some embodiments, the P-CSCF binding can be stored internally to the TAS as a local cache and externally as a separate database. FIG. 5 illustrates an example flowchart of routing decisions in accordance with one or more embodiments of the present technology. Upon receiving a request for a mobile-terminating (MT) unregistered call, the TAS can check if the relevant information can be found in its local cache. If found, the information can help facilitate subsequent communication with the P-CSCF as part of the S-CSCF recovery. If the information is not found in the local cache, the TAS can further check if the information is stored in an external database that it has access to. Again, if the information is found in the external database, the information can help facilitate subsequent communication with the P-CSCF as part of the S-CSCF recovery. If the information is not found, the TAS can fall back to circuit switched support for handling the call.

Figure 6A:
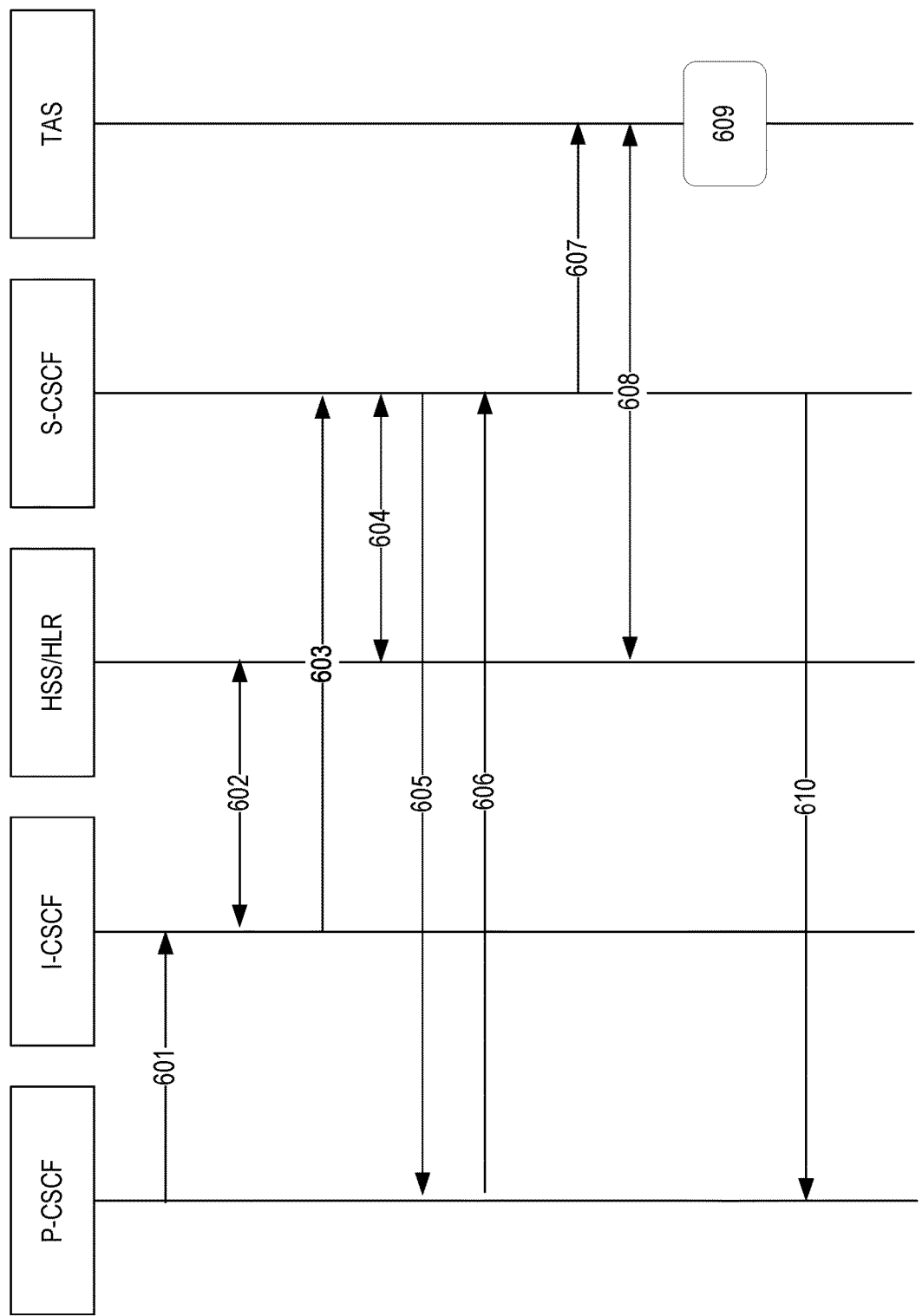
FIG. 6A illustrates an example SIP registration call flow in accordance with one or more embodiments of the present technology.

FIG. 6A illustrates another example SIP registration call flow in accordance with one or more embodiments of the present technology. Operations 601 to 607 are similar to Operation 301 to 307 in FIG. 3A. At operation 608, the TAS exchanges SNR/SNA messages with the HSS/HLR to retrieve a user profile. As discussed earlier, the user profile can be implemented as an XML document that includes different parts such as public identification, core network service authorization. In some embodiments, a separate recovery profile (e.g., implemented in an XML or a table format) can be used to store the P-CSCF binding information. The HSS/HLR can store the P-CSCF binding information to the user profile or the recovery profile document (e.g., as an XML entry or a field in the table). Alternatively, or in addition, at Operation 609, the TAS can store such information in an internal cache or an external database that it has access to. The SIP registration then completes at Operation 610.

Figure 6B:
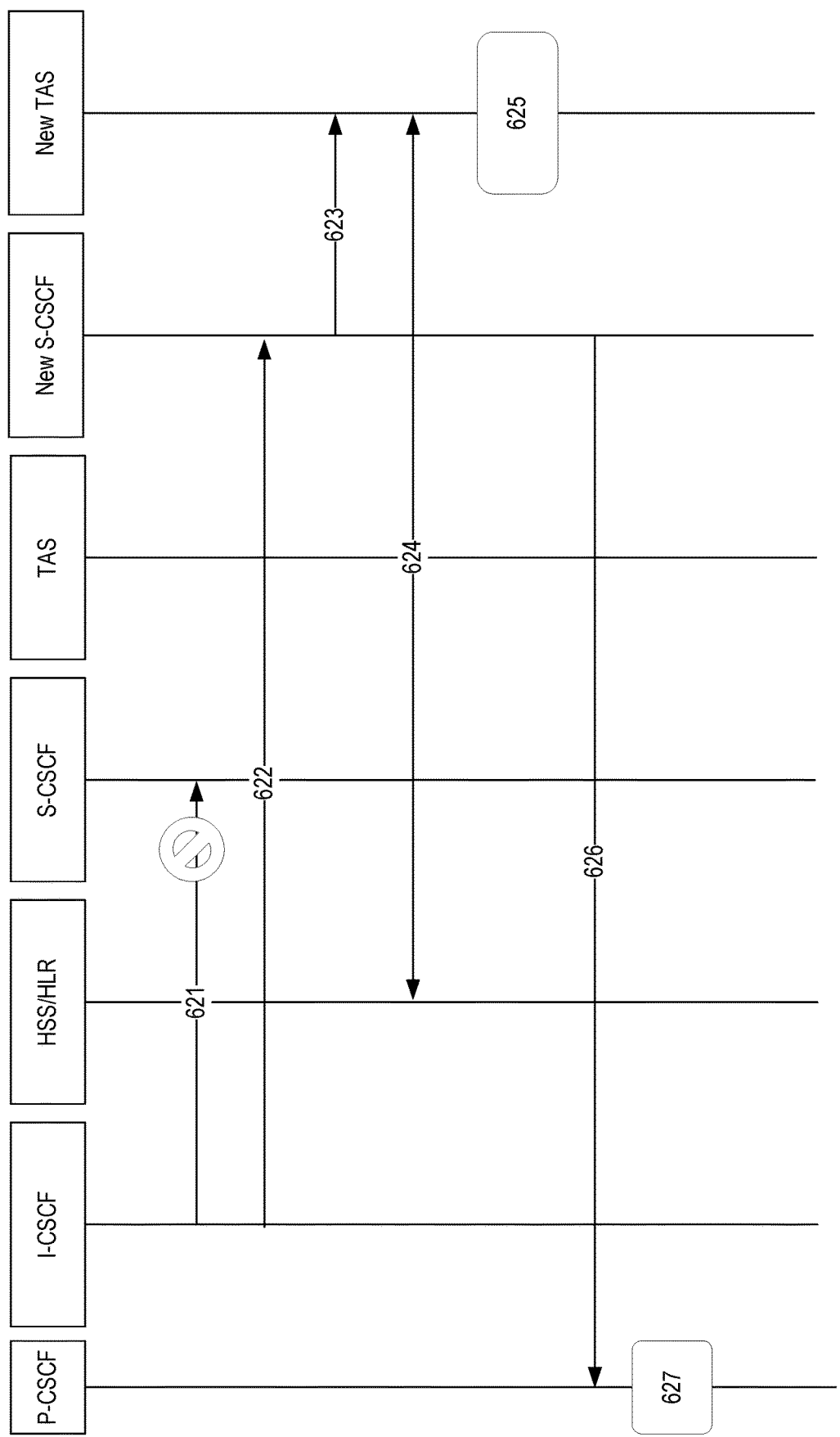
FIG. 6B illustrates an example SIP call flow when the S-CSCF is unavailable in accordance with one or more embodiments of the present technology.

When the S-CSCF becomes unreachable to the P-CSCF/I-CSCF at Operation 621, as shown in FIG. 6B, which illustrates another example SIP call flow in accordance with one or more embodiments of the present technology, the I-CSCF can select a new S-CSCF at Operation 622 and the newly selected S-CSCF can forward the routing invite to a new TAS at operation 623. When TAS receive the INVITE, it executes its operation for telephony services handling. At Operation 624, the new TAS can exchange SNR/SNA messages with the HSS/HLR to download the user profile. In some embodiments, the HSS/HLR stores the P-CSCF binding information to the user profile that it sends to the TAS. The TAS responds back to the new S-CSCF sending the routing invite at Operation 623 with the P-CSCF binding information to be used to allow the S-CSCF to transmit an SIP invite with the P-CSCF binding at Operation 626. In some embodiments, if the HSS/HLR has already transmitted such information to the TAS during SIP registration, the TAS can search for such information in its local cache or an external database at Operation 625. Upon receiving the SIP invite, the P-CSCF can create a new S-CSCF binding for the duration of the call at Operation 627 such that the mobile-terminating call can be successfully completed.

Figure 6C:
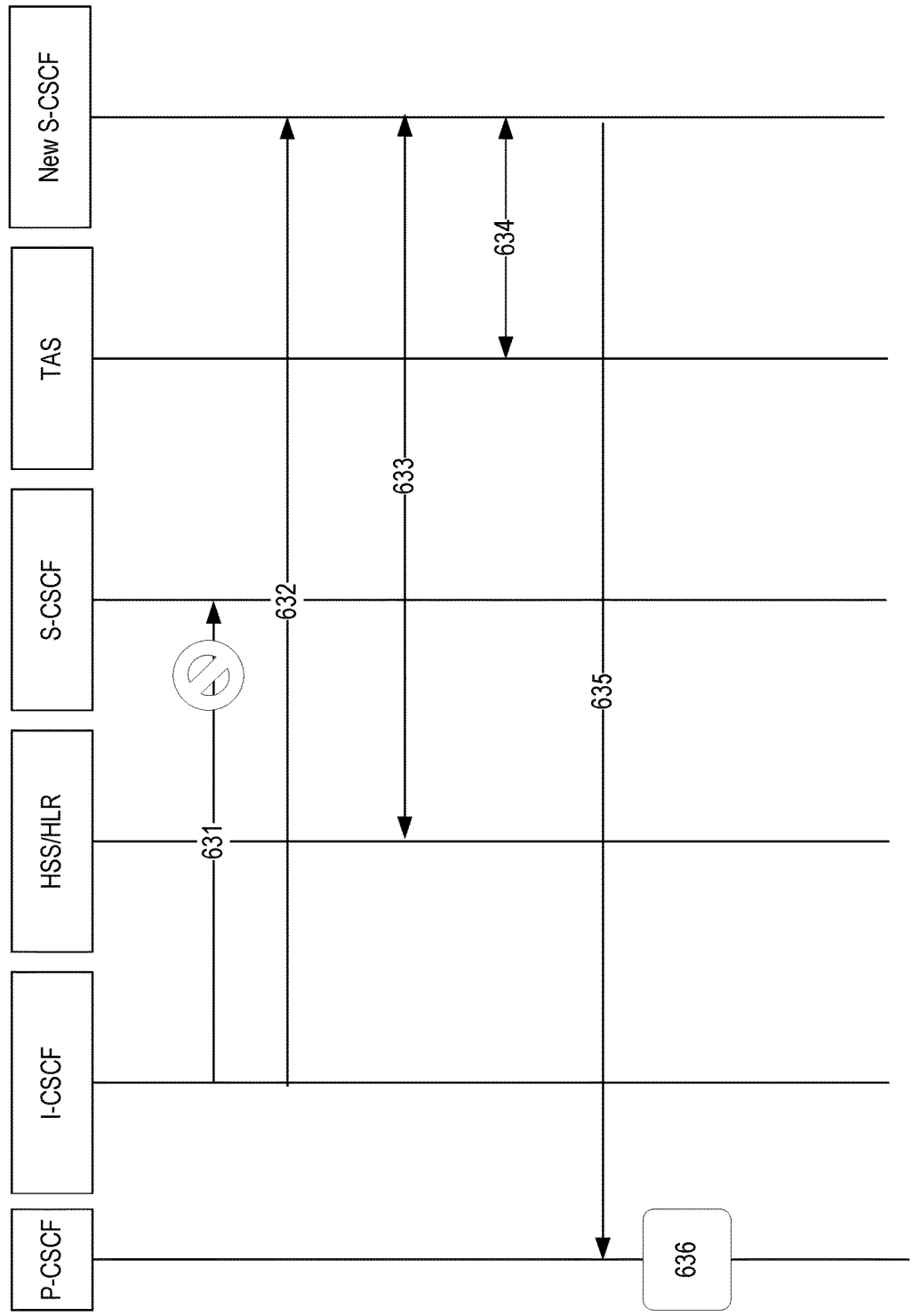
FIG. 6C illustrates yet another example SIP call flow in accordance with one or more embodiments of the present technology.

FIG. 6C illustrates yet another example SIP call flow in accordance with one or more embodiments of the present technology. Operation 631-633 in FIG. 6C are similar to Operation 621-623 in FIG. 6B. At Operation 634, the newly selected S-CSCF can exchange SRA/SAA messages with the HSS/HLR to download the user profile. In some embodiments, the HSS/HLR stores information such as the P-CSCF binding information to the user profile that it sends to the newly selected S-CSCF. If the information is not present in the user profile from the HSS/HLR, the newly selected S-CSCF can retrieve such information from the TAS, which has obtained the information from the HSS/HLR during the registration procedure and stored the information in an internal cache or an external database. The new S-CSCF then transmits an SIP invite with the P-CSCF binding at Operation 635. Upon receiving the SIP invite, the P-CSCF can create a new S-CSCF binding for the duration of the call at Operation 636 such that the mobile-terminating call can be successfully completed.

Figure 7A:
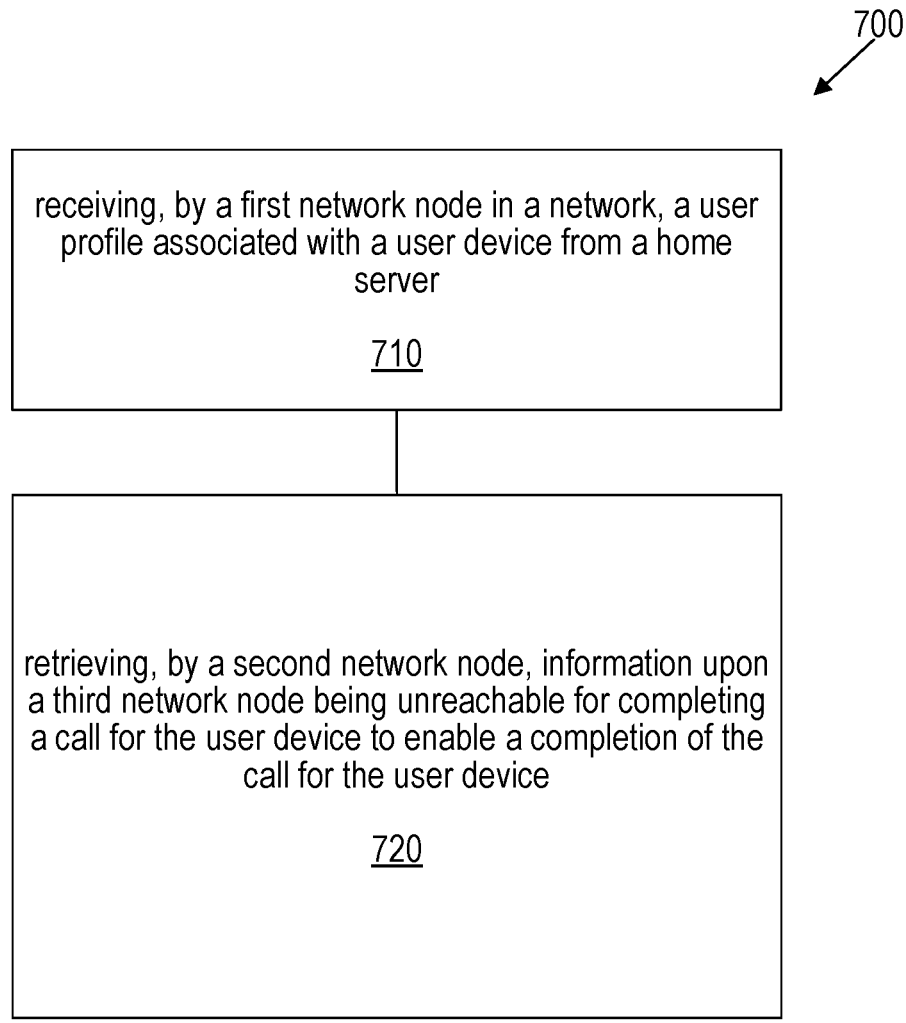
FIG. 7A is a flowchart representation of a process or a method for wireless communication in accordance with one or more embodiments of the present technology.

FIG. 7A is a flowchart representation of a process or a method for wireless communication in accordance with one or more embodiments of the present technology. The process 700 includes, at operation 710, receiving, by a first network node in a network, a user profile associated with a user device from a home server configured to manage subscriber information. The first network node comprises a first Telephony Application Server (TAS). The user profile comprises information about a Proxy Call Session Control Function (P-CSCF) that is in communication with the user device (such as the P-CSCF binding). The process 700 includes, at operation 720, retrieving, by a second network node, the binding information of the P-CSCF upon a third network node being unreachable for completing a call for the user device to enable a completion of the call for the user device.

In some embodiments, the second network node comprises a second TAS, and the third network node comprises a Serving Call Session Control Function (S-CSCF), such as shown in FIG. 4B and FIG. 6B. The process further comprises transmitting, by the second TAS, the binding information of the P-CSCF to a newly selected S-CSCF to enable the completion of the call. In some embodiment, the user profile is received as part of a Session Initiation Protocol (SIP) registration procedure. The process further comprises storing, by the first network node, the binding information of the P-CSCF in an internal cache or an external database that is accessible to one or more network nodes in the network. In some embodiments, the second network node is same as the first network node.

Figure 7B:
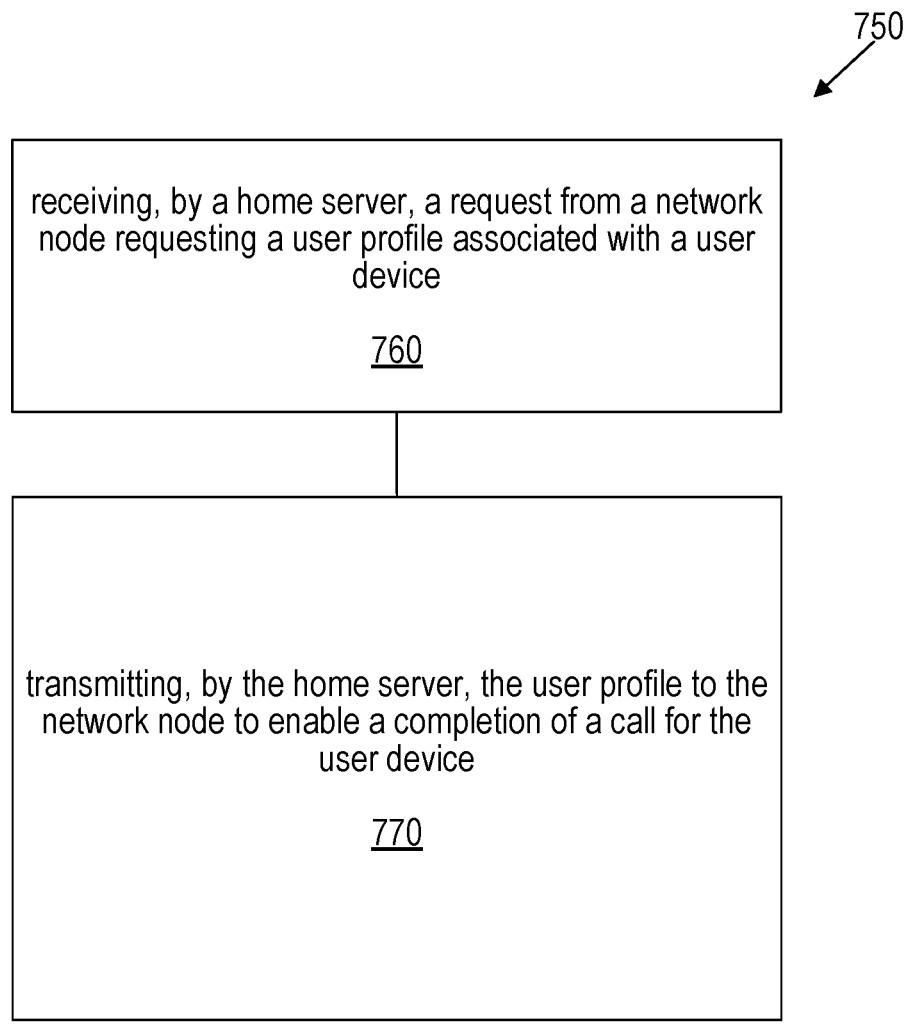
FIG. 7B is a flowchart representation of another process or method for wireless communication in accordance with one or more embodiments of the present technology.

FIG. 7B is a flowchart representation of a process or a method 750 for wireless communication in accordance with one or more embodiments of the present technology. The process 750 includes, at operation 760, receiving, by a home server configured to manage subscriber information, a request from a network node (e.g., a TAS or a S-CSCF) requesting a user profile associated with a user device. The process 800 includes, at operation 770, transmitting, by the home server, the user profile to the network node to enable a completion of a call for the user device. The user profile comprises information about a Proxy Call Session Control Function (P-CSCF) that is in communication with the user device.

Figure 8:
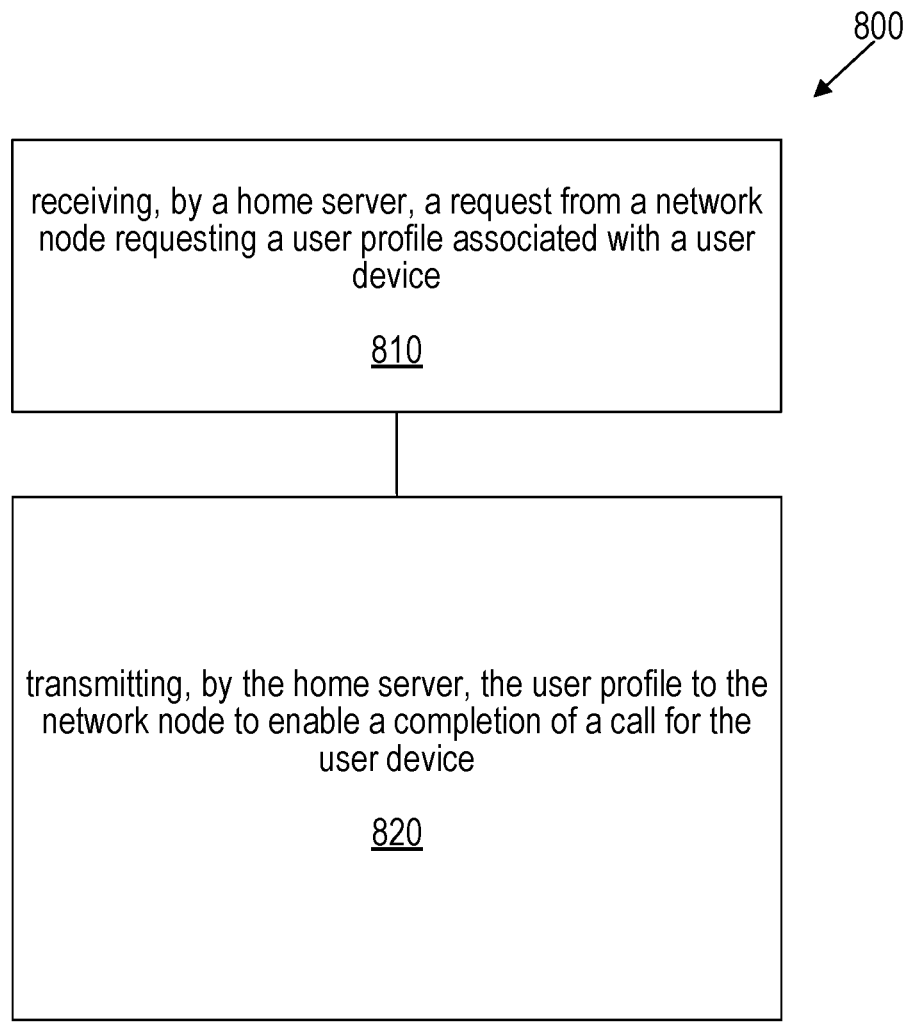
FIG. 8 is a flowchart representation of yet another method for wireless communication in accordance with one or more embodiments of the present technology.

FIG. 8 is a flowchart representation of a process or a method 800 for wireless communication in accordance with one or more embodiments of the present technology. The process 800 includes, at operation 810, receiving, by a first network node in a network, a user profile associated with a user device from an internal cache or an external database that is accessible to the first network node. The first network node comprises a first Telephony Application Server (TAS). The user profile comprises binding information of a Proxy Call Session Control Function (P-CSCF) that is in communication with the user device. The binding information of the P-CSCF indicates a secure association between the P-CSCF and the user device. The process 800 includes, at operation 820, retrieving, by a second network node, the binding information of the P-CSCF upon a third network node being unreachable for completing a call for the user device to enable a completion of the call for the user device.

In some embodiments, the second network node comprises a second TAS, and the third network node comprises a Serving Call Session Control Function (S-CSCF), such as shown in FIG. 4B and FIG. 6B. The process further comprises transmitting, by the second TAS, the binding information of the P-CSCF to a newly selected S-CSCF to enable the completion of the call. In some embodiment, the user profile is received as part of a Session Initiation Protocol (SIP) registration procedure. The process further comprises storing, by the first network node, the binding information of the P-CSCF in an internal cache or an external database that is accessible to one or more network nodes in the network. In some embodiments, the second network node is same as the first network node.

Computer System

Figure 9:
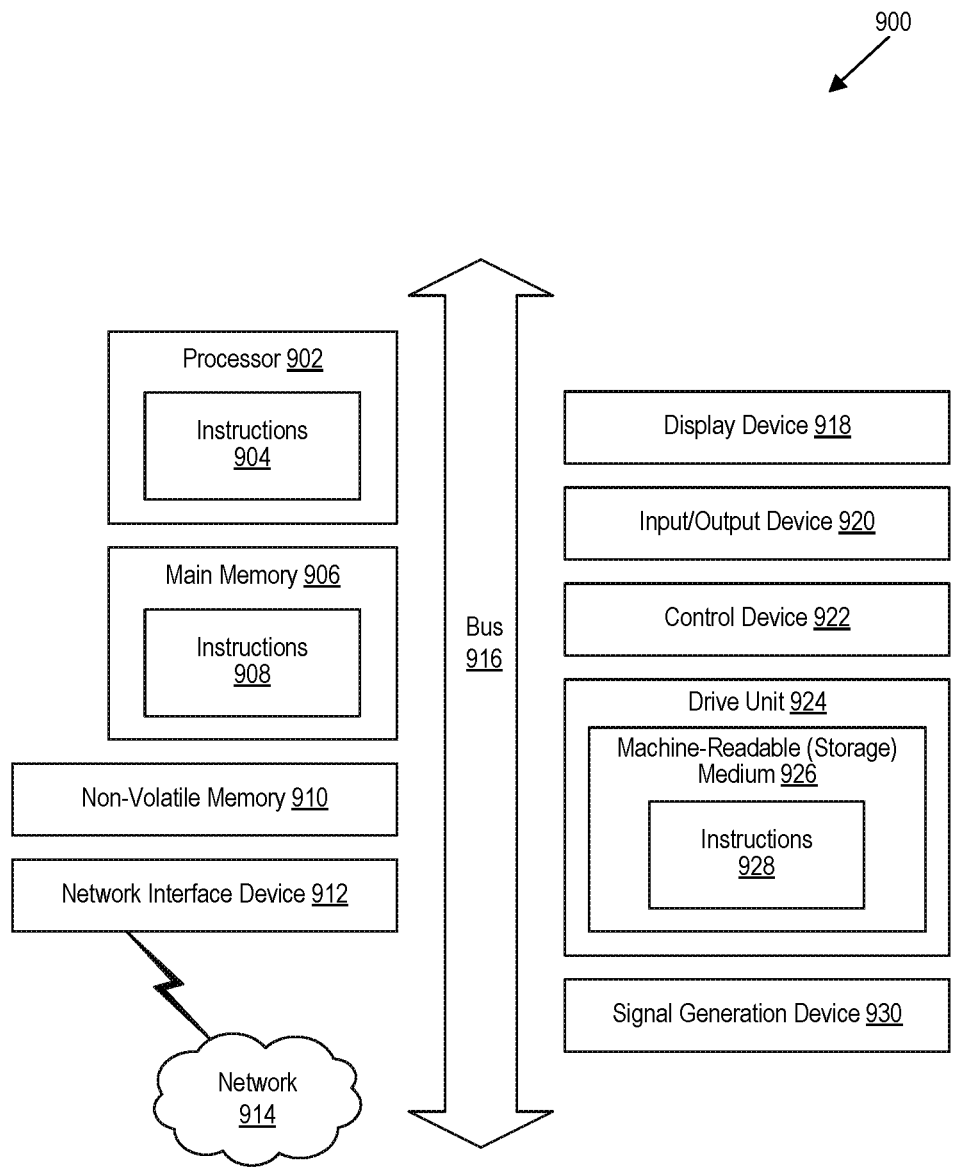
FIG. 9 is a block diagram that illustrates components of a computing device.

FIG. 9 is a block diagram that illustrates an example of a computer system 900 in which at least some operations described herein can be implemented. As shown, the computer system 900 can include: one or more processors 902, main memory 906, non-volatile memory 910, a network interface device 912, video display device 918, an input/output device 920, a control device 922 (e.g., keyboard and pointing device), a drive unit 924 that includes a storage medium 926, and a signal generation device 730 that are communicatively connected to a bus 916. The bus 916 represents one or more physical buses and/or point-to-point connections that are connected by appropriate bridges, adapters, or controllers. Various common components (e.g., cache memory) are omitted from FIG. 9 for brevity. Instead, the computer system 900 is intended to illustrate a hardware device on which components illustrated or described relative to the examples of the figures and any other components described in this specification can be implemented.

The computer system 900 can take any suitable physical form. For example, the computing system 900 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 900. In some implementation, the computer system 900 can be an embedded computer system, a system-on-chip (SOC), a single-board computer system (SBC) or a distributed system such as a mesh of computer systems or include one or more cloud components in one or more networks. Where appropriate, one or more computer systems 900 can perform operations in real-time, near real-time, or in batch mode.

The network interface device 912 enables the computing system 900 to mediate data in a network 914 with an entity that is external to the computing system 900 through any communication protocol supported by the computing system 900 and the external entity. Examples of the network interface device 912 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 906, non-volatile memory 910, machine-readable medium 926) can be local, remote, or distributed. Although shown as a single medium, the machine-readable medium 926 can include multiple media (e.g., a centralized/distributed database and/or associated caches and servers) that store one or more sets of instructions 928. The machine-readable (storage) medium 926 can include any medium that is capable of storing, encoding, or carrying a set of instructions for execution by the computing system 900. The machine-readable medium 926 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 910, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 904, 908, 928) set at various times in various memory and storage devices in computing device(s). When read and executed by the processor 902, the instruction(s) cause the computing system 900 to perform operations to execute elements involving the various aspects of the disclosure.

Remarks

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

What is claimed is:

1. A system for wireless communication, comprising:
    a Proxy Call Session Control Function (P-CSCF) that is in communication with a user device in a network;
    a first Serving Call Session Control Function (S-CSCF);
    a first Telephony Application Server (TAS) in communication with the first S-CSCF,
        wherein the first TAS is configured to store a first profile and a second profile associated with the user device in a location that is accessible to one or more TASs in the network,
        wherein the first profile comprises a first binding information of the P-CSCF that is in communication with the user device,
        wherein the second profile comprises a second binding information of the P-CSCF that is in communication with the user device,
        wherein the second binding information includes one or more ciphering and integrity keys associated with establishing a security association between the P-CSCF and the user device, and
        wherein the first profile is configured to be used at least when the first S-CSCF is reachable to other network nodes in the network, and the second profile is configured to be used when the first S-CSCF is not reachable to other network nodes in the network;
    a second S-CSCF that is selected upon the first S-CSCF being unreachable to other network nodes in the network; and
    a second TAS in communication with the second S-CSCF,
        wherein the second TAS is configured to retrieve the first or second binding information of the P-CSCF from the location that is accessible to the one or more TASs in the network, and
        wherein the second S-CSCF is configured to:
            receive the first or second binding information of the P-CSCF from the second TAS; and
            transmit a message to the P-CSCF based on the first or second binding information of the P-CSCF to complete a communication for the user device.

2. The system of claim 1, wherein the first TAS and the second TAS are same.

3. The system of claim 1, wherein the first profile is implemented as an Extensible Markup Language (XML) document, and wherein the first binding information of the P-CSCF is added as an entry in the XML document.

4. The system of claim 1, wherein the first or second binding information of the P-CSCF is stored together with P-CSCF's subscription information to the S-CSCF.

5. The system of claim 1, wherein the location accessible to the one or more TASs in the network comprises an internal cache or an external database.

6. The system of claim 1, wherein the location accessible to the one or more TASs in the network comprises a home server configured to manage subscriber information for the user device.

7. The system of claim 6, wherein the home server comprises a Home Subscriber Server (HSS) or a Home Location Register (HLR).

8. A method for wireless communication, comprising:
    storing, by a first network node in a network, a first profile and a second profile associated with a user device in a location that is accessible to the first network node,
        wherein the location that is accessible to the first network node includes a home server configured to manage subscriber information;
    receiving, by the first network node, the second profile associated with the user device from the home server, wherein the first network node comprises a first Telephony Application Server (TAS), wherein the first profile comprises a first binding information of a Proxy Call Session Control Function (P-CSCF) that is in communication with the user device, wherein the second profile comprises a second binding information of the P-CSCF that is in communication with the user device, wherein the second binding information of the P-CSCF indicates a secure association between the P-CSCF and the user device, wherein the first profile is configured to be used at least when a third network node is reachable to other network nodes in the network, and the second profile is configured to be used when the third network node is not reachable to other network nodes in the network; and retrieving, by a second network node, the first or the second binding information of the P-CSCF upon the third network node being unreachable for completing a call for the user device to enable a completion of the call for the user device.

9. The method of claim 8, wherein the second network node comprises a second TAS, and wherein the third network node comprises a Serving Call Session Control Function (S-CSCF).

10. The method of claim 9, further comprising:
transmitting, by the second TAS, the first or the second binding information of the P-CSCF to a newly selected S-CSCF to enable the completion of the call.

11. The method of claim 8, wherein the first or second profiles are received as part of a Session Initiation Protocol (SIP) registration procedure.

12. The method of claim 11, further comprising:
storing, by the first network node, the first or second binding information of the P-CSCF in an internal cache or an external database that is accessible to one or more network nodes in the network.

13. The method of claim 8, wherein the second profile is implemented as an Extensible Markup Language (XML) document, and wherein the second binding information of the P-CSCF is added as an entry in the XML document.

14. A method for wireless communication, comprising:
storing, by a first network node in a network, a first profile and a second profile associated with a user device in a location that is accessible to the first network node,
wherein the location that is accessible to the first network node includes an internal cache or an external database that is accessible to the first network node;

receiving, by the first network node in the network, the second profile associated with the user device from the internal cache or the external database that is accessible to the first network node, wherein the first network node comprises a first Telephony Application Server (TAS), wherein the first profile comprises a first binding information of a Proxy Call Session Control Function (P-CSCF) that is in communication with the user device, wherein the second profile comprises a second binding information of the P-CSCF that is in communication with the user device, wherein the second binding information of the P-CSCF indicates a secure association between the P-CSCF and the user device, wherein the first profile is configured to be used at least when a third network node is reachable to other network nodes in the network, and the second profile is configured to be used when the third network node is not reachable to other network nodes in the network; and retrieving, by a second network node, the first or the second binding information of the P-CSCF upon the third network node being unreachable for completing a call for the user device to enable a completion of the call for the user device.

15. The method of claim 14, wherein the second network node comprises a second TAS, and wherein the third network node comprises a Serving Call Session Control Function (S-CSCF).

16. The method of claim 15, further comprising:
transmitting, by the second TAS, the first or the second binding information of the P-CSCF to a newly selected S-CSCF to enable the completion of the call.

17. The method of claim 14, wherein the second network node is same as the first network node.

18. The method of claim 14, wherein the first or second profiles are received as part of a Session Initiation Protocol (SIP) registration procedure.

19. The method of claim 14, wherein the second profile is implemented as an Extensible Markup Language (XML) document, and wherein the second binding information of the P-CSCF is added as an entry in the XML document.

20. The method of claim 14, wherein the second profile is implemented in a table format.

* * * * *